United States Patent [19]
Caves et al.

[11] Patent Number: 4,713,807
[45] Date of Patent: Dec. 15, 1987

[54] INTELLIGENCE TRANSMISSION SYSTEM OF THE LOCAL AREA NETWORK TYPE

[75] Inventors: Keith Caves; Douglas E. Woodman, both of Sawbridgeworth, Great Britain

[73] Assignee: STC PLC, London, England

[21] Appl. No.: 866,433

[22] Filed: May 22, 1986

[30] Foreign Application Priority Data

May 24, 1985 [GB] United Kingdom ............... 8513248

[51] Int. Cl.⁴ ................... H04Q 11/04; H04J 3/00; H04J 3/06
[52] U.S. Cl. ................................. 370/94; 370/89; 370/108
[58] Field of Search ............... 370/85, 86, 60, 94, 370/89, 108; 340/825.05, 825.5

[56] References Cited

U.S. PATENT DOCUMENTS 4,251,880  2/1981  Baugh et al. .................. 370/89
4,538,263  8/1985  Gabrielli et al. ............... 370/89
4,549,291 10/1985  Renoulin et al. ............... 370/89
4,553,234 11/1985  Brandsma et al. ............... 370/89

Primary Examiner—Douglas W. Olms
Assistant Examiner—Frank M. Scutch, III
Attorney, Agent, or Firm—Lee, Smith & Zickert

[57] ABSTRACT

A system of the local area network (LAN) type using a closed loop optical fibre transmission medium, in which a series of stations, one of which acts as a master station, are connected to the loop. In each TDM cycle, a group of adjacent time slots is used as a framing group which occurs once per cycle of the system, the framing group including a multi-bit group number position which identifies a slot or group of slots. The loop includes a latency buffer to set the loop delay time to exactly 125 micro seconds, and the system according to the invention provides for both circuit-switched and packet-switched connections. To set up a circuit-switched connection, a free slot is chosen and its identity signaled in a packet manner. The proportion of slots allocated to circuit connections is varied dynamically, with indication thereof conveyed in a framing group of slots which occurs once in a cycle.

11 Claims, 1 Drawing Figure

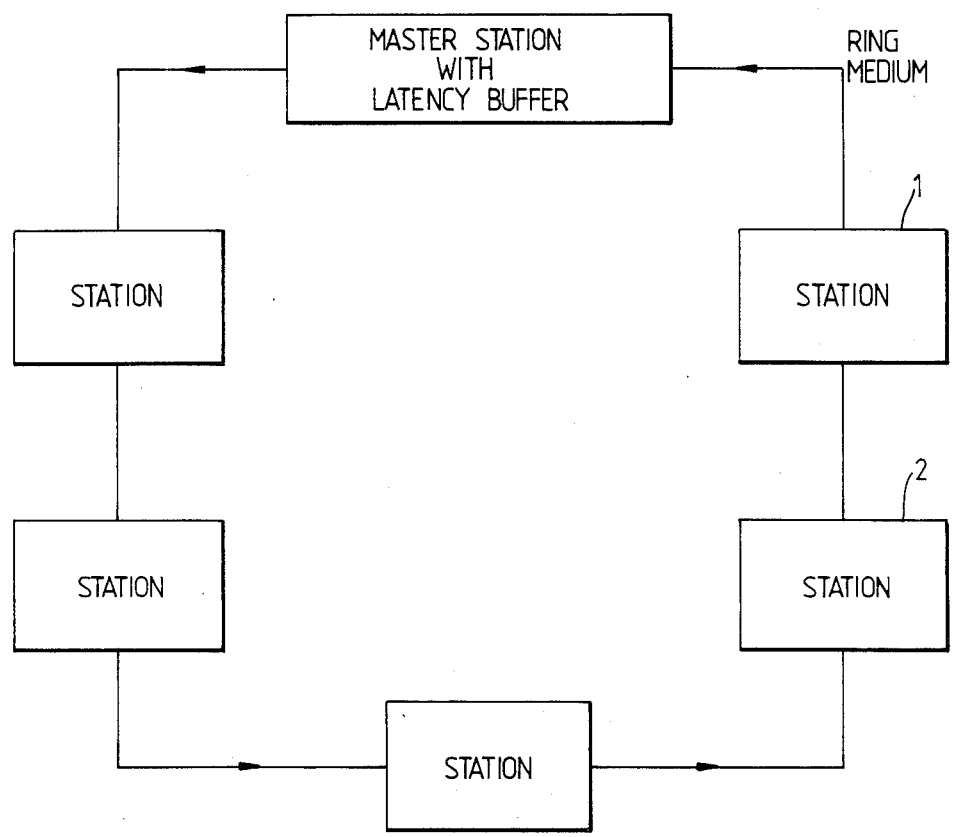

INTELLIGENCE TRANSMISSION SYSTEM OF THE LOCAL AREA NETWORK TYPE

The present invention relates to a Local Area Network (LAN) of the closed-loop type.

According to the invention there is provided an intelligence transmission system of the closed-loop type, in which a number of stations one of which acts as a Master Station are connected to the loop, in which the system handles both circuit-switched and packet-switched calls, in which in each TDM cycle a group of adjacent time slots is used as a framing group which occurs once per cycle of the system, which framing group includes a multi-bit group number (GN) portion which identifies a said slot or group of slots, in which on system start-up the value of the GN in the framing group is initially set to zero by the Master Station whereafter it is incremented by the Master Station by unity on each system cycle, in which when the value of GN reaches the maximum number of slots available for circuit-switched connections, that value is reset to zero, whereafter the sequence recommences, in which after the value of GN has reached its maximum fo the first time a packet-switching token is emitted from the Master Station to indicate to the other stations on the loop that packet-switched connections can be handled, whereafter the Master Station repeats the token each time it receives it, and in which the maximum value of GN attained during a said sequence, as read by a said station on the loop indicates to that station how many time slots are currently available for circuit-switched connections.

An embodiment of the invention will now be described with reference to the accompanying highly schematic drawing.

SUMMARY

The system to be described herein is a hybrid version of the ANSI FDDI Token Ring, FDDI standing for Fibre Distributed Data Interface. It should be noted that the invention is also applicable to LAN's using metallic communication media. The system provides an FDDI with a circuit-switching capability in addition to its packet-switching capability. For this, a change of bit rate on the fibre optic transmission media is proposed, from 100 Mbit/sec. to a rate more appropriate to circuit switching standards.

The hybrid FDDI ring includes stations such as 1, 2, in the drawing linked serially by fibre optic transmission media to form a ring, and the protocols used allow the stations on the ring to communicate by both circuit switching and packet switching.

In normal operation, one station acts as a Master Station, although a number (if not all) of the other ring stations has this capability. The Master Station generates a regular frame structure onto the transmission medium; this structure is repeated by all other stations. The frames generated comprise a fixed number of time slots, each slot carrying a fixed number of bits at the ring data rate. The frame structure provided is described in detail.

Since a prime objective of hybrid FDDI is to support 64 kBit/sec. circuit switched calls, it is convenient for the frame structure to repeat cyclically every 125 microseconds. To achieve this, the Master Station 3 uses a Latency Buffer to build out the transmission delay around the ring to a fixed 125 microseconds. Data received at the Master Station from the ring is thus queued in the Latency Buffer before being clocked out onto the ring. This buffer can conveniently be a shift-register having a number of stages appropriate to making up the time delay around the ring to 125 microseconds. In the present system several stations, and in fact if desired all stations, can be capable of acting as Master Stations. In such case all stations which can act as Master Stations have latency buffers, with associated circuitry.

To use the circuit switching capability, a station first locates and reserves an unused circuit slot. Each such slot offers a fixed 64 kbit/sec. bandwidth, sufficient to support an 8-bit digital PCM voice call; higher handwidth is available by reserving multiple circut slots. Following slot reservatiuon, the slot is 'owned' by the reserving station for the duration of the call and must be released at the end of the connection. Ring capacity not being used for circuit switching is made available for packet switching. The token passing protocol specified for FDDI allows ring stations access to the packet switching facility.

HYBRID FDDI FRAME STRUCTURE

At system initialisation, the active stations on the ring co-operate to select a Master Station from amongst themselves. Thereafter, the Master Station is responsible for ensuring the presence of a regular frame structure at intervals of 125 microseconds on the transmission media. The details of the frame structure are given below.

FRAME FORMAT

The frame structure supported is dependent on the ring transmission rate. For example, a ring transmission rate of 122.88 Mbaud is assumed, i.e. a data rate of 98.304 Mbit/sec. Since the objective is to support 64 kbit/sec. voice calls encoded as 8-bit PCM samples, this leads to a requirement for 125 microsecond frames each carrying 1536 8-bit time slots.

Note that the North American multiplex transmission standard bit rate is 1.544 Mbit/sec., whereas the similar European standard is 2.048 Mbit/sec. There is thus no single ring transmission rate close to 125 Mbaud which meets both of these standards. Since $61 \times 2.048 = 124.928$ Mbaud and $81 \times 1.544 = 125.064$ Mbaud, then a relaxation in the frequency tolerance from $+/-0.005\%$ to $+/-0.006\%$ would permit a common clock frequency of $124.996 +/- 0.006\%$ to cover both of these possible ring transmission rates. However, neither 124.928 Mbaud nor 125.064 Mbaud leads to a 125 microsecond frame containing a whole number of bits and so neither rate is practical. Hence different ring transmission rate standards are needed to meet the requirements of North America and Europe.

To revert to the present system, the frame time slots are organised in groups, each group consisting of 8 contiguous slots. The first group in a frame is known as the framing group and carries 8 slots which have a special format. This group is used for carrying specific, non-user generated information as described below. The remaining 191 groups, numbered 0 through 190, are used to carry circuit switched and packet switched data.

The format of a frame is as follows:

|FG|G0|G1|G2|//|G189|G190|

FG = Framing Group
G0 = Group Zero
G1 = Group 1
...
G190 = Group 190

←——————125 microsecs.——————→

The format of groups 0 to 190 is as follows:

——————————————Group N——————————————

|Slot 1|Slot 2|Slot 3|Slot 4|Slot 5|Slot 6|Slot 7|Slot 8|

Each slot carries 8 bits.
The format of the framing group is as follows:

|SD|GN|SI|SS|FI|MI|CI|PI|BN|SN|UN|

The frame start delimiter SD consists of two consecutive symbols, known as J-symbols, which provide a unique bit pattern not used elsewhere in the frame.

The group number GN is an 8-bit binary number which identifies a particular group of 8 slots within the frame amongst 191 groups available for circuit and packet switching.

The slot identifier SI is an 8-bit field which, in conjunction with GN, indicates the state of occupancy of the 8 time slots in a given group.

The slot supervision field SS consists of 8 bits, used in conjunction with GN by the Master Station for supervisory purposes, i.e. to determine which slots in a given group are 'owned' by stations on the ring.

The fault indicator FI is a single-bit field used to indicate the presence of a serious ring fault.

The Master Station selection indicator MI is a single-bit field used to indicate that the Master Station selection process is active.

The changeover indicator CI is a single-bit field used by the Master Station, in conjunction with GN to indicate that stations should transfer their ownership of slots in a particular group to other group slots.

The priority level indicator PI is a 3-bit field used in conjunction with GN by the Master Station, to indicate the minimum priority level of calls permitted to search for a free slot in the current value of GN.

Each station is allocated a unique, 10-bit binary (to allow for up to 1000 stations), non-zero bidding number BN which is used in the selection of a Master Station and during the resynchronisation process. In normal operation, the BN field carries the Master Station bidding number.

The sequence number SN is a 10-bit binary number which is set to an all-zeros value by the Master Station in each frame and incremented by one count at each station as the frame transits the ring.

The final 6 bits UN of the framing group are reserved for possible further use.

CIRCUIT AND PACKET SWITCHING BANDWIDTH ALLOCATION

The number of groups of slots in a frame available for circuit switching, and thus the number of groups available for packet switching, is determined by the Master Station in a dynamic manner. The smallest allocation of bandwidth made is equivalent to one group of 8 slots, i.e. $8 \times 64 = 512$ kbit/sec.

At system start-up, the Master Station makes an arbitrary allocation of groups to circuit switching—say, 100 groups (i.e. 800 slots) numbered G0 to G99. The Master Station informs the other ring stations of the amount of bandwidth available for circuit switching the GN field in the framing group. With each successive frame generated, the Master Station increments GN from its initial minimum value G0 to Gmax (G99 in the present example), after which GN in the next frame starts again at G0, and so on. The maximum value reached by GN indicates the number of group slots available for circuit switching. In addition, as soon as the initial GN cycle is completed, the Master Station releases the packet switching token in the (Gmax+1) slot group, since by now all stations are aware of the slot groups reserved for circuit and packet switching.

In this example, it takes $100 \times 125$ microseconds = 12.5 milliseconds to inform all stations on the ring of the slot groups available for both circuit and packet switching. Then each station only has to maintain a record of the highest value reached by GN during its latest cycle to remain up-to-date on the circuit and packet switching bandwidth allocations.

By noting the occupancy of circuit switching slots in each frame, the Master Station determines whether circuit switching bandwidth is over- or under-provided. If under-provided, the Master station makes additional slot groups available (up to some preset maximum) by raising the highest value of GN. If over-provided, the Master Station reduces the number of groups available by lowering the highest value of GN. In this case, any stations using circuit slots in groups that are to be made available to packet switching, are first informed to change those slots for empty slots in lower-numbered groups. The protocol for slot changeover is described later.

PACKET SWITCHING OPERATION

Any of the slot groups not currently in use for circuit switching can be used for packet switched data. The token passing protocols and the token and packet formats used can follow known principles. Since data packets and tokens are carried within the frame structure generated by the Master Station, they pass through the latency buffer exactly as for circuit slots and so take 125 microseconds to go once around the ring.

A single token, generated by the Master Station and inserted into a frame in the first slot group available for packet switching, is passed around the ring from one station to the next, carrying with it the right to transmit packets. When a station has packet data to transmit, it removes the token from the frame and places packet data into the group slots available for packet switching. The amount of data for transmission may occupy packet switching group slots in more than one frame. On completion of its packet transmission, the station releases the token back into a frame to occupy the first available packet switching group slots that are contiguous with the just-completed packet transmission.

In addition to its use for 'normal' packet data handling, the packet switching capability is also used to carry the signalling traffic associated with circuit switched calls. Thus, a minimum packet switching bandwidth must always be available for this purpose. However, when there is doubt about the presence on the ring of a Master Station, as indicated by the MI bit in the framing group, all packet switching functions are disabled until a Master Station has been selected or reselected.

CIRCUIT SWITCHING OPERATION

Each station on the ring synchronises its operations to the received frame structure, so that it is aware at any time of which slot is being received in which group. To communicate with another ring station in circuit-switched mode, a station first locates and then reserves a free one of the slots currently allocated to circuit switching. After reserving a slot, to be used for the call to be terminating station, using the packet switching facility. This is in the manner described in Great Britain Patent Application No. 8313195 (M. T. Shortland 1). Thereafter, the one slot can be used to transfer 64 kbit/sec. in each direction between the two stations, with each station replacing the 8 bits of data received in the slot with its own outgoing data.

When a circuit switched call is desired which requires more than 64 kbit/sec. of bandwidth, e.g. for a video call, multiple free slots may be reserved. The slots do not have to be contiguous, but may be distributed amongst the groups available for circuit switching.

A Broadcast capability is also supported by the circuit switching capability. A single station writes data to a circuit slot and other stations read data from that slot without writing to it.

RESERVING A CIRCUIT SLOT

To reserve a slot for a circuit switched call, a station first waits for the group number GN, carried by the framing group of each frame, to cycle round to G0 (indicating group zero). The station examines the slot identifier field SI associated with G0 to determine the state of occupancy of the 8 slots in G0. If SI indicates that all of the G0 slots are busy, the station waits for the next frame to examine the SI associated with G1. As before, if SI indicates that all of the G1 slots are busy, the station waits for the next frame to determine the occupancy of the G2 slots, and so on. Sooner or later, unless all allocated circuit slots are busy, the SI will indicate that one or more of the slots in a particular group (GX, say) is free. The station then reserves the first available slot (slot Y, say) in Gx by changing the appropriate bit in the SI field to indicate the busy condition. A signalling message, initiated by the originating station and transferred via the packet switching facility informs the terminating station that slot Y in group X has been reserved for the call. The two stations can then exchange circuit switched data in the nominated slot.

As the framing group in each frame returns to the Master Station, it records any changes in circuit slot occupancy indicated by the SI field. Hence, with each new frame generated, the Master Station increments GN and provides via SI an up-to-date record of circuit slot occupancy to the other ring stations.

A priority mechanism with eight levels of priority is superimposed onto the above slot reservation protocol. The three bits in the priority level indicator PI, with GN, control the priority access mechanism. The Master Station inserts an appropriate value of PI into the framing group. A value of PN indicates that all calls of priority equal to or greater than PN may search the group slots indicated by the current value of GN for a free slot. Thus, stations having calls of the highest priority are permitted to search the full range of circuit switching groups for a free slot, while stations with lower priority calls are restricted to searching the lower values of circuit switching group numbers of a free slot. Thus a progressive load control is implemented so that as a system becomes more and more heavily loaded, it only accepts new calls of higher and higher priority. For example, by assigning a low priority value to calls requiring multiple circuit slots, they can be prevented from locking out other calls on a busy system.

Such a slot reservation protocol always leads to the lowest-numbered available circuit slot being reserved for a new call. Thus if demand for circuit switching slots falls, as the slots in the highest-numbered groups become free, they remain free. Under-utilisation of the allocated circuit switching bandwidth thus manifests itself as a progressive emptying of slots in the highest-numbered groups. This enables the Master Station to take appropriate remedial action, by reducing the highest value of GN and so making one or more of the highest-numbered groups available for packet switching.

The worst-case time taken to reserve a circuit slot is calculated as follows. Suppose that 100 groups are allocated to circuit switching, and that $GN=2$ when a station decides to reserve a circuit slot. The station must wait for GN to cycle round to G0, i.e. for $99 \times 125$ microseconds bfore it begins searching for a free slot. Now suppose that the only free slot available is in G99; the station takes a further $99 \times 125$ microseconds to find and reserve a free slot. Maximum slot reservation time in this case is thus approximately 25 milliseconds. An avertage reservation time of about half of this figure would be more normal, i.e. approximately 12.5 milliseconds. By extrapolation, it can be seen that for a system with almost all of its bandwidth allocated to circuit switching, the worst case and average slot reservation times are approximately 50 milliseconds and 25 milliseconds, respectively.

If the above slot reservation times are unacceptable, they can be reduced by a minor change to the reservation algorithm. For example, if a station decides to reserve a slot and the value of GN in the next frame received is less than half its maximum allocated value, the station could begin looking for a free slot immediately. Otherwise, the station would wait for GN to cycle round to G0 before starting the search. Other variants on this theme are clearly possible, with the threshold value of GN at which immediate search is permitted being varied to suit the particular implementation.

MAINTAINING A CIRCUIT SLOT

A supervisory protocol, controlled by the Master Station and described later, periodically checks each circuit slot for ownership. Other than responding correctly to supervisory requests, a station takes no further action after slot reservation to maintain the ownership and use of a slot. It merely writes data into the slot to send to the terminating station(s) and reads the received data in the return direction.

Under normal conditions, all stations using a slot should have stopped using it before it is released by the owning station. If a station fails, or is taken out of the ring, the supervisory protocol enables the Master Station to determine the lack of ownership of a slot and to return the slot to a free condition. The other station(s) using that slot are aware from the appropriate GN/SI field combination that the slot has been freed and will stop using it.

RELEASING A CIRCUIT SLOT

Before releasing a circuit slot, the station that reserved the slot and now owns it first agrees with the other station(s) using the slot, by means of a signalling message via the packet switching facility, that the call is at an end. Following this message, the other station(s) stop using the slot. The owning station then waits for the frame containing the correct GN in the framing group to cycle round and releases the slot by changing the appropriate bit in the SI field to indicate a free slot. When the frame reaches the Master Station, it observes the changed slot occupancy indicated by SI and updates its records accordingly.

CIRCUIT SLOT CHANGEOVER

As described earlier, when demand for circuit switching slots is falling, the slot reservation protocol causes a natural tendency for slots in the highest-numbered circuit switching groups to become free. This allows the Master Station to reduce the highest value of GN carried in the framing group and so increase the packet switching bandwidth. However, it is clear that a situation could arise in which a single, long-duration call occupied a slot in the highest-numbered circuit switching groups whilst several lower-numbered circuit switching groups were entirely free, effectively preventing the Master Station from increasing the packet switching bandwidth. Under these circumstances, the Master Station invokes the slot changeover protocol. It does this by setting the changeover indicator CI in the frame carrying the appropriate (highest) value of GN, to indicate that the station using the slot in this group should reserve a slot in a lower-numbered group and then release the currently-used slot. This involves the station in some signalling via the packet switching facility. If more than one slot is being used in the group addressed by GN, the changeover instruction applies equally to all slots.

The slot changeover protocol, together with the slot reservation protocol, enables circuit and packet switching bandwidth allocations to be varied dynamically in response to user demand, but without the need for frequent slot changeover instructions.

OTHER PROTOCOLS

The protocols used by Hybrid FDDI that have not been described so far as presented in the following sections.

MASTER STATION SELECTION

When a system is first switched on, the active stations on the Hybrid FDDI ring invoke a protocol for the selection of a Master station. Selection is based on the individual station's unique bidding numbers.

On becoming active, the stations on the ring attempt to acquire frame synchronisation by searching for, and then locking on to, the start of frame delimiter SD which begins each frame. Initially, the stations fail to acquire synchronisation within the relevant timeout period, because of the lack of a Master Station to generate the frame pattern. Each station then begins to generate its own frames, with its individual bidding number BN in the BN field of the framing group and the Master Station selection indicator MI set to indicate that the selection process is active. Additionally, each station will attempt to pad out the total ring latency to 125 microseconds by means of its latency buffer. In effect, at this stage of the process, all stations are acting as 'standby' Master stations.

Stations then begin to examine the incoming bitstream for the presence of a start of frame delimiter SD. If an SD is detected, and the BN in the received framing group is inferior to its own BN, a station discards the incoming frames and continues to generate its own frames. On the other hand, if the BN in the received frame is superior to its own BN, a station abandons its own transmissions and repeats the incoming frames. The other possibility is that a station receives a frame contining its own BN. If this happens for two consecutive frames, the station has wond the selection process (i.e. its bidding number is the highest of the stations currently active on the ring). That station then becomes the Master Station and continues to send its own BN in the appropriate field of the framing group, but sets the MI indicator to indicate completion of the Master Station selection process. All other stations now acquire frame synchronisation from the frames generated by the Master Station.

As soon as the Master Station selection process is complete, the Master Station begins to increment the value of GN entered in successive frames. The maximum value reached by GN indicates the circuit switching bandwidth allocation, after which the Master Station generates a token for insertion into the first group slot of the packet switching bandwidth. So long as the MI bit indicates the presence of a Master Station, the token passing protocol used for packet switching is active. However, as soon as the MI indicates that the selection process is active (i.e. that the Master Station is absent), the token passing protocol is disabled at all stations.

When a new station enters the ring, it first acquires frame synchronisation and then examines the Master Station's BN. If its own BN is inferior to the Master Station's, the new station repeats the received frame structure just like any other (non-Master) station. However, if its own BN is superior to the Master Station's, the new station begins to generate frames containing its own BN, exactly as described for the initial selection process above. The selection protocol ensures that the new station becomes the Master Station, taking on the responsibility for all of the associated functions.

SYNCHRONISATION

The ring Master Station is responsible, under normal conditions, for generating the frame format, including the framing group. The start of frame delimiter SD at the beginning of each frame enables other ring stations to acquire and maintain frame synchronisation. Frame synchronisation is deemed to have been acquired when a station detects the SDs of two consecutive frames in their correct relative positions.

A station loses frame synchronisation on failure to detect the SD for two consecutive frames. A search of the incoming bitstream is then performed for two further frame periods in an attempt to re-acquire synchronisation quickly. If no SD is detected during this time, the station assumes that the Master Station has failed and invokes the Master Station selection process, as described above. Generally, the outcome of the selection process is either that the old Master Station reasserts itself, or that a new Master Station is chosen. In either case, the end result is the presence on the ring of a frame structure which enables stations to acquire synchronisation.

FAULT RECOVERY

A serious ring fault, such as a break in the transmission media or a station failure, initially manifests itself as a loss of synchronisation at all stations. This leads automatically to the Master Station selection protocol being invoked. However, the ring fault ensures that the selection protocol fails. This is recognised by stations when there is still no Master Station present after a suitable timeout.

Failure of the selection process results in some stations continuing to generate their own frames, containing their own bidding numbers BN, and other stations repeating the frames as received. The dispositions of the two types of station depends on the relationship of their bidding numbers to their positions on the ring. However, the outcome of the selection failure is that the stations still generating their own frames change the fault indicator bit FI in the framing group to indicate the presence of a serious ring fault. Any station receiving a frame with FI so set ceases its own frame transmissions and repeats the incoming frame, so long as the value of its own bidding number and that in the incoming frame are different. This leads eventually to the situation where the only station generating frames (as opposed to repeating them) is the station immediately downstream from the fault. After a suitable timeout, this station recognises its position relative to the fault and takes the appropriate action to bypass the faulty ring segment (or the failed station) and restore the system to health.

The station taking the recovery action recognises the success of its actions when it starts to receive incoming frames in which the FI bit is set to indicate a fault and the BN field contains its own bidding number. After receiving two consecutive frames of this type, the station resets the FI indicator to indicate that the ring fault situation has been rectified. However, the MI indicator remains set so that the Master Station selection process is repeated, this time successfully.

SLOT SUPERVISION

As described, the combination of GN and SI fields in each frame enables stations to indicate the reservation and release of circuit switching slots by setting the appropriate bits in the SI field. By observing the state of the individual bits in the SI field of each returning frame, in association with the relevant GN carried by the frame, the Master Station can maintain an up-to-date record of all slots allocated to circuit switching. Before recording any changes in slot occupancy, the Master station waits for the next frame with the particular GN to ascertain that the original change was not merely due to a transmission error.

With each new frame that it generates, the Master Station increments the value of GN, and transmits its record of slot occupancy for that slot group in the SI field. All ring stations are thus kept informed of the current state of occupancy of the circuit switching slots, as well as being given the opportunity to indicate slot reservation and release. In addition to recording the state of circuit switching slot occupancy and informing the other ring stations of this record, the Master Station performs a supervisory function on the circuit switching slots. In each frame that it generates the Master Station provides a slot supervision field SS which is transmitted containing an all-zeros bit pattern. Any station on the ring that currently 'owns' a slot in the group identified by the GN being carried by the frame, changes the appropriate bit in the SS field accordingly. The returning SS field then enables the Master Station to check its records against the supervisory information provided by the ring stations. In the event of a discrepancy between its records and the returning supervisory information, the Master Station waits until the next time that the particular group is being supervised for confirmation. If confirmation is obtained, the Master Station updates its records, otherwise no action is taken.

The SS field also provides a means for stations to check for 'double-booked' slots, which would result in crossed calls. Any station currently owning a slot that is marked as being owned by another station, first waits for confirmation until the next time that the slot in contention is being supervised. If confirmation of double booking is obtained, the station recognising this condition immediately relinquishes any claims on the slot, reserves another slot and informs the other station(s) involved in the call.

The slot supervision protocol enables the Master Station to supervise each circuit switching slot at least once every 24 milliseconds (the worst case case of all available bandwidth being allocated to circuit switching).

STATION SEQUENCE NUMBER

The Master Station generates an all-zeros sequence number which it inserts into the sequence number field SN of each frame. On its way around the ring, the SN is incremented by a count of one at each station; that count then becomes that station's SN. In this manner, all stations are aware of their positions on the ring in relation to the Master Station.

The SN can also be used by stations newly joining the ring in place of a MAC address. The station would thus be enabled to apply to the Master Station (or to some other easily identifiable station) for a MAC address, or for a bidding number. This use of SN could be incorporated into the station management protocols as part of the token passing protocols of Reference 1.

We claim:

1. An intelligence transmission system of the closed-loop type, in which a number of stations one of which acts as a Master Station are connected to the loop, in which the system handles both circuit-switched and packet-switched calls, in which in each TDM cycle a group of adjacent time slots is used as a framing group which occurs once per cycle of the system, which framing group includes a multi-bit group number (GN) portion which identifies a said slot or group of slots, in which on system start-up the value of the GN in the framing group is initially set to zero by the Master Station whereafter the value of the GN is incremented by the Master Station by unity on each system cycle, in which when the value of GN reaches the maximum number of slots available for circuit-switched connections, that value is reset to zero, whereafter the sequence recommences, in which only after the value of GN has reached its maximum for the first time a packet-switching token is emitted from the Master Station to incidate to the other stations on the loop that packet-switched connections can be handled, whereafter the Master Station repeats the token each time the Master Station receives the token and in which the maximum value of GN attained during a said sequence, as read by a said station on the loop indicates to that station how many times slots are currently available for circuit-switched connections.

2. An intelligence transmission system of the closed-loop type, in which a number of stations one of which acts as a Master Station are connected to the loop, in which the system handles both circuit-switched and packet-switched calls, in which in each TDM cycle of the system the time slots are grouped in groups each of n adjacent time slots, and one of said groups of adjacent time slots is used as a framing group which occurs once per cycle of the system, in which the framing group includes a multi-bit group number (GN) portion which identifies a particular one of said groups of slots, in which on system start-up the value of the GN in the framing group is initially set to zero by the Master Station whereafter the value of the GN is incremented by the Master Station by unity on each system cycle, in which when the value of GN reaches the maximum number of slot groups available for circuit-switched connections, that value is reset to zero, whereafter the sequence recommences in which only after the value of GN has reached its maximum for the first time a packet-switching token is emitted from the Master Station to indicate to the other stations on the loop that packet-switched connections can be handled, whereafter the Master Station repeats the token each time the Master Station receives the token, and in which the maximum value of GN attained during a said sequence, as read by a said station on the loop indicates to that station how many time slot groups are currently available for circuit-switched connections.

3. A system as claimed in claim 2, in which the Master Station monitors the proportion of the slots in use for both types of connections to assess whether the number of slots provided for circuit-switched connections is under- or over-provided, and in which if the number is incorrect the Master Station makes an appropriate adjustment to the value of GN during a subsequent said sequence.

4. A system as claimed in claim 3, and in which if the number of groups of slots in use for circuit-switched connections is excessive and the value of GN is reduced, any calls using slots being transferred from circuit-switched use to packet-switched use are transferred to other slots allocated to circuit-switched use.

5. A system as claimed in claim 2, in which when a said token reaches a station with packet data to send that token is removed from the loop, the packet data is transmitted, and the token reinserted into the loop at the end of the packet data, and in which one packet message can extend from the frame wherein it started into the packet-allocated slots in a later frame.

6. A system as claimed in claim 2, in which when a circuit switched connection is to be set up the calling station monitors the bit stream on the loop in search of a free time slot allocated to circuit switched connections, in which when such a free slot is found it is marked as busy and a message indicating the identity of the newly-seized time slot is sent over the loop to the wanted station in packet-switching manner, and in which when a wanted station receives such a message it sets itself to respond to the slot identified by that message.

7. A system as claimed in claim 6, in which when a connection using circuit switching needs more bandwidth than is available from one slot, two or more slots allocated to circuit switching are seized for use.

8. A system as claimed in claim 6 in which to provide a broadcast capability a single station writes data into a circuit slot and other stations read data therefrom without writing into that slot.

9. A system as claimed in claim 7 in which in each group of slots allocated to circuit switched connections there is a slot identifier field which indicates which slots of a group are free, and in which the selection of a free slot involves the calling station checking the slot identifier fields to select a slot group with at least one free slot, followed by the selection of a free slot from within the selected group.

10. A system as claimed in claim 6, in which a priority mechanism is provided by which each station is allocated one of a plurality of priority levels, in which the Master Station includes in the framing group a priority level indicator PI, and in which said station whose PI is equal to or greater than that in the framing group has access to all circuit switching slots whereas stations of a lower priority only have access to the lower-numbered circuit-switched slots, and in which the value of the indicator PI in the framing group is adjusted in accordance with the traffic state of the system.

11. A system as claimed in claim 6, in which when a station to which a circuit switching slot is allocated concludes its use it notifies the other station or stations involved in that connection of the fact by sending a packet switched release message.

* * * * *